United States Patent Office 3,446,477
Patented May 27, 1969

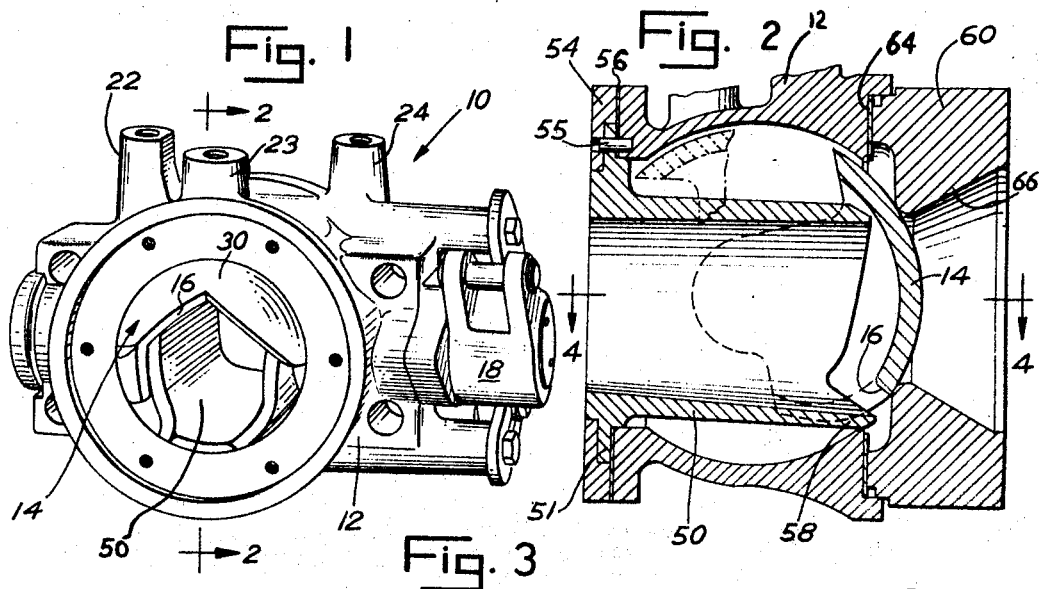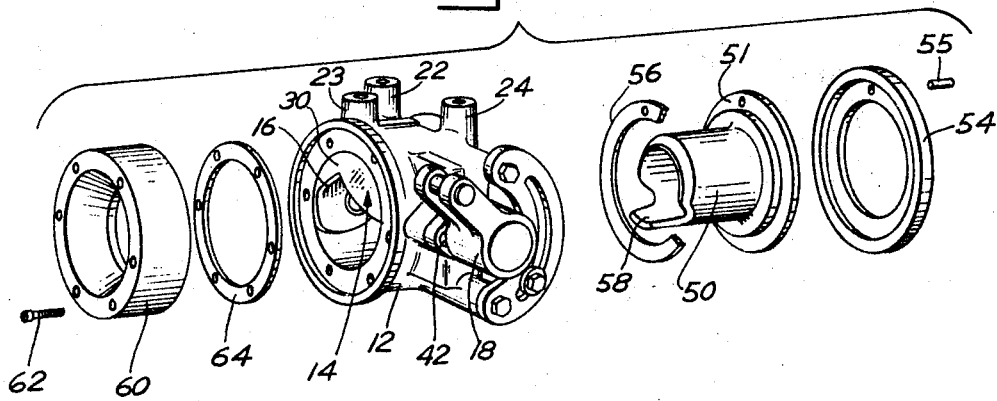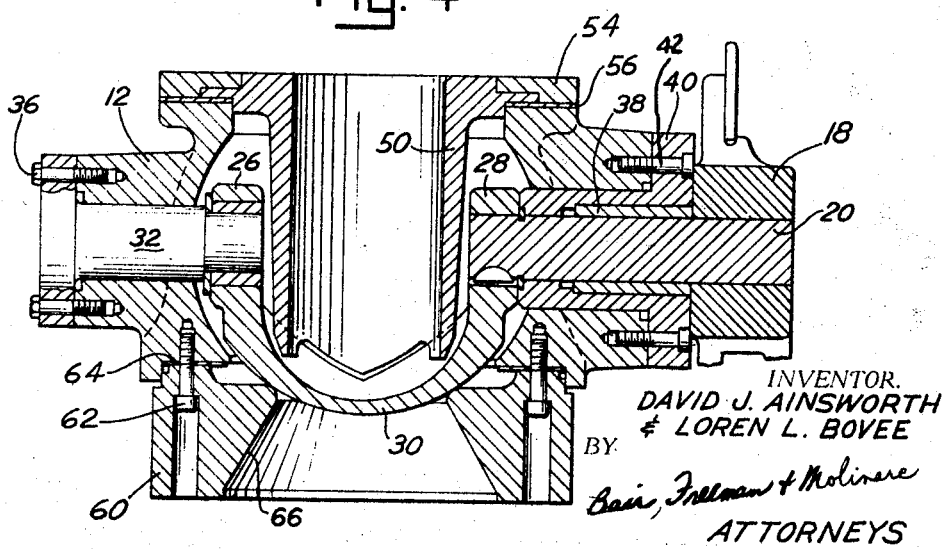

3,446,477
BALL VALVE CONSTRUCTION
David J. Ainsworth and Loren L. Bovee, Marshalltown, Iowa, assignors to Fisher Governor Company, Marshalltown, Iowa, a corporation of Iowa
Filed Dec. 5, 1966, Ser. No. 599,298
Int. Cl. F16k 5/06, 5/12
U.S. Cl. 251—208      5 Claims

ABSTRACT OF THE DISCLOSURE

A flow control valve having an annular housing disposed in the opening through the valve for defining fluid flow passage. The housing includes a tongue-like projection for cooperating with an inverted notch in the valve plug. Alignment means are provided for orienting the housing about its longitudinal axis to properly position the tongue-like projection with respect to the notch in the valve.

Background of the invention

This invention relates to a flow control valve and, more particularly, to a flow control valve for controlling and throttling fluids containing abrasive solids.

Conventional valves designed to handle free flow semi-solid materials, such as ball valves, gate valves, and butterfly valves are subject to extreme wear and cratering within the valve body. Such valves tend to present a flat area to the fluid flow stream within the valve body which allows the impingement of abrasive solids upon the flat area tending to create turbulence within the valve body and causing excessive wear to the valve body and internal parts. The present invention is concerned with providing a flow control valve better capable of resisting erosion while throttling abrasive fluids.

An object of the present invention is to provide a novel flow control valve having an annular housing in the passage therein downstream from the valve plug, such housing having a characterized front and configuration for catching and entraining in the annular housing abrasive turbulent flow when the flow control valve is throttling at low lift or very nearly on its seat.

Another object of the present invention is to provide a novel flow control valve having a valve plug rotatably supported within a valve body for controlling the flow of material through the valve body, an annular housing or liner being disposed in the passage within the valve body for resisting erosion and wear of the valve body and the internal components of the flow control valve in use.

Yet another object of this invention is to provide an improved flow control valve having a valve body with a passage therethrough, a spherical valve plug having an inverted V-shaped opening therein for regulating flow through said passage, and an annular housing having a tongue-like projection thereon disposed in the passage adjacent the passage inlet for catching and entraining turbulent flow when the valve plug is throttling very nearly on its seat.

A further object of the present invention is to provide a flow control valve of the type described with a reduced port seat flow ring attached to the inlet end of the valve body, the internal configuration of the seat flow ring defining a Venturi, the outlet of which is of smaller diameter than the maximum internal diameter of the opening through the annular housing within the valve body, the seat flow ring being capable of directing the flow of fluid to the center of the annular housing for minimizing turbulent flow through the valve body. Other objects and advantages of the present invention will become more apparent hereafter.

Brief description of the drawing

The novel structural components and their mode of functioning will be made most manifest and particularly pointed out in clear, concise and exact terms in conjunction with the accompanying drawings wherein:

FIG. 1 is a perspective view of a flow control valve embodying the principles of the present invention;

FIG. 2 is a cross-sectional view of the flow control valve taken generally along the line 2—2 of FIG. 1;

FIG. 3 is an exploded perspective view of the flow control valve illustrating the seat flow ring and the annular housing or liner; and FIG. 4 is a cross-sectional view of the flow control valve taken generally along the line 4—4 of FIG. 2.

Description of the preferred embodiment

Referring now to FIG. 1, there is illustrated a flow control valve designated generally by the numeral 10. The flow control valve includes a valve body 12 and a valve plug 14 therein for controlling the flow of fluid through the valve body. The valve body 12 and the valve plug 14 are generally of the type disclosed in the patent of Ralph W. Zeigler and Hubert J. Grabenbuer, Patent 3,191,906, granted June 29, 1965. The valve plug 14 is provided with an inverted V-shaped opening 16. The valve plug 14 is supported within the flow passage in the valve body for rotation about a generally horizontal axis. Lever 18 is secured to the end of the shaft member 20 and to actuating mechanism (not shown) for effecting rotation of the valve plug to open and close the flow passage through the valve body.

Three bosses 22, 23 and 24 may be provided on the valve body 12 for permitting affixation of a suitable actuator mechanism to the valve body.

Referring to FIGS. 2 and 4, there is seen the internal construction of the flow control valve. As aforenoted, it is intended that the present flow control valve be utilized for fluids which contain solid materials or for semi-solid fluid masses which may be of a corrosive or abrasive nature. The valve plug 14, which preferably has a hardened external surface, as for example by chrome plating, comprises journal members 26 and 28 formed integrally at each side of a generally hemispherical portion 30. The inverted V-shaped opening 16 is formed in portion 30.

The means for rotatably supporting the valve plug 14 within the casing 12 comprise a journal shaft 32 and an actuating stem or shaft 20. Bolts or machine screws 36 secure the head of the journal member 32 in place on valve body 12.

The actuating shaft 20 is rotatably journaled in a bearing 38 supported within a recess in the journal member 40. The journal member 40 is secured to the valve body 12 by means of suitable screws or machine bolts 42. At its inner end, the actuating shaft 20 is keyed to the valve plug 14 and at the outer end the actuating shaft 20 is secured to a lever or link member 18 which in turn is connected to actuating linkage.

A first feature of the present invention is the provision within the flow passage through the valve body of an annular housing or liner member 50 having a characterized front end configuration.

The front end of the liner 50 is provided with a tongue or forwardly projecting portion 58 which protrudes forwardly into the region of the V-shaped notch 16 in the valve plug 14.

It will be noted that the flange 51 is spaced rearwardly from the forward end of the liner a sufficient distance such that there will be clearance when the valve plug 14 is rotated to the open position as indicated by the fragmentary phantom showing in FIG. 2. The purpose of the tongue or forwardly extending projection 58 is to catch and entrain within the liner abrasive turbulent flow when the valve plug is throttling at intermediate valve lifts or when the valve plug is very nearly on its seat.

At the rear thereof, the annular liner 50 is provided with a generally radially extending flange 51 having a portion cooperating with an annular shoulder of the valve body for properly positioning the liner in the passage in valve body 12. A shouldered retaining ring 54 having an internal configuration complemenatry to the external configuration of the flange is adapted to hold the flange 51 in place on the valve body 12. A dowel pin 55 extends through aligned openings in the valve body 12, flange 51 and retaining ring 54 for properly orienting the annular liner 50 in desired position within the flow passage of valve body 12. A suitable seal or gasket 56 is disposed between the abutting faces of retaining ring 54 and valve body 12 to prevent leakage between these elements. The retaining ring 54, the liner 50 and the gasket 56 are all held in place by the pipeline bolting (not shown) which straddles the entire ball valve assembly and clamps the parts together when it is installed for service.

Another feature of the present invention is the provision of a seal flow ring 60, which is attached to the inlet end of the valve body 12 by suitable fastening means, as for example, machine bolts 62. A suitable seal 64 may be disposed between the flow ring 60 and the abutting face of the valve body 12 to prevent leakage between the abutting surfaces. Defined within the flow ring 60 is a Venturi opening 66, forming a Venturi, the outlet of which is of smaller diameter than an internal diameter of the liner 50. The seal flow ring is capable of directing the fluid flow to the center of the liner 50.

A further feature of this invention is that the liner can be replaced readily. In prior devices, the interior of the valve body was hard-faced with a material such as Stellite to render the valve body more resistant to wear in extremely hard service. For some applications, the hard facing is inadequate and is worn away. The liner of the present invention, when worn, can be replaced quickly and with relatielvy low cost.

The combination of the flow ring having a Venturi opening therein with the annular liner having a characterized front end configuration protects the interior surfaces of the flow passage and virtually eliminates extreme wear and cratering even when the valve is used in extremely erosive slurry service.

While we have shown a preferred form of our invention, it is obvious that other modifications will appear to those persons skilled in the art, and we desire that the invention be limited only within the scope of the following claims.

What is claimed is:

1. In a flow control valve comprising valve body means having a passage therethrough, a valve plug rotatably supported in said passage for regulating flow through the valve body means, the valve plug being generally spherical and having an inverted notch provided therein, the flow path through the valve body means being between the wall of the valve plug defining the notch and the valve body means, the valve body means being subject to corrosion and wear in use, the improvement comprising an annular housing disposed in said passage downstream form the valve plug, the annular housing forming an opening through which flow may pass, the annular housing being provided on one end with a tongue-like projection which extends generally into the area of the notch when the valve plug is closed, the annular housing tongue-like projection catching and entraining turbulent flow when the valve plug is throttling very nearly on its seat, the tongue-like projection being at the lower part of the inlet end to the annular housing, and alignment means cooperating with the annular housing and the valve body means for orienting the annular housing such that the tongue-like projection is disposed in predetermined relationship with respect to the valve plug notch.

2. A flow control valve as in claim 1, wherein the valve body means includes a flow ring disposed in the inlet to the passage in the valve body, the flow ring having a Venturi opening therein, the outlet from the Venturi opening being smaller in diameter than an internal diameter of the opening in the annular housing, the flow ring functioning to direct flow into the center of the annular housing.

3. A flow control valve as in claim 1 wherein the annular housing has a flange at its rear end and the alignment means cooperate with the flange and the valve body means for orienting the annular housing such that the tongue-like projection is disposed in selected position with respect to the valve plug notch.

4. A flow control valve as in claim 1 wherein the annular housing is detachably secured within the valve body for ease in replacement.

5. A flow control valve as in claim 1 wherein the tongue-like projection is complementary in configuration to the valve plug notch.

References Cited

UNITED STATES PATENTS

| 1,941,443 | 12/1933 | Moran et al. | 251—124 X |
| 2,357,341 | 9/1944 | Miner | 251—124 |
| 2,883,147 | 4/1959 | Mivza et al. | 251—301 X |
| 3,191,906 | 6/1965 | Zeigler et al. | 251—208 |

WALTER A. SCHEEL, *Primary Examiner.*

LEON G. MACHLIN, *Assistant Examiner.*

U.S. Cl. X.R.

251—118